UNITED STATES PATENT OFFICE.

FRIEDRICH A. BRUNS, OF NEW YORK, N. Y., ASSIGNOR TO HIMSELF AND JAMES L. TRUSLOW, JR., OF BROOKLYN, NEW YORK.

PRESERVING HOPS.

SPECIFICATION forming part of Letters Patent No. 279,127, dated June 12, 1883.

Application filed September 11, 1882. (No specimens.)

To all whom it may concern:

Be it known that I, FRIEDRICH ADOLPH BRUNS, of the city, county, and State of New York, have invented certain new and useful Improvements in Preserving Hops, of which the following is a specification.

This invention has reference to a method of preserving hops so as to prevent the deterioration and loss of essential oils to which they are exposed by long storage; and the invention consists of mixing the kiln-dried hops with powdered sugar and then compressing the hops into suitable shape.

In carrying out my invention I mix one hundred parts of hops, after they are kiln-dried, with from ten to fifty parts, more or less, of finely-powdered loaf-sugar, powdered grape-sugar, or sugar-dust. This sugar-dust is mechanically mixed with the hops by means of suitable appliances, after which the mixture is compressed into packages of suitable size. The effect of the intermixture of the sugar-dust with the hops is that the air is forced out from between the leaves of the hops, while the sugar-dust fills up the small interstices between them. The sugar-dust has the further advantage that it unites with and retains the volatile oils contained in the flowers of hops and prevents their loss by evaporation, as the ingress of air is prevented by the intimate compacting of the hops.

Hops thus mixed with sugar-dust and compressed can be stored for any length of time without undergoing any change and without losing their flavor.

Hops thus prepared can be shipped all over the world, and can be used at any time, the sugar dissolving readily with the hops when they are boiled up and exerting an advantageous influence on the extract obtained and the fermenting process in brewing.

Having thus described my invention, I claim as new and desire to secure by Letters Patent—

As a new article of manufacture, kiln-dried hops mixed with sugar-dust and compressed into suitable shape, substantially as described.

In testimony that I claim the foregoing as my invention I have signed my name in presence of two subscribing witnesses.

FRIEDRICH ADOLPH BRUNS.

Witnesses:
PAUL GOEPEL,
SIDNEY MANN.